United States Patent
Ohya et al.

(10) Patent No.: US 7,208,026 B2
(45) Date of Patent: Apr. 24, 2007

(54) HEAT-RESISTANT FILTER

(75) Inventors: Tomoaki Ohya, Ichihara (JP); Makoto Nakahara, Otsu (JP)

(73) Assignees: Dainippon Ink and Chemicals, Inc., Tokyo (JP); Toray Industries, Inc., Tokyo (JP)

( * ) Notice: Subject to any disclaimer, the term of this patent is extended or adjusted under 35 U.S.C. 154(b) by 26 days.

(21) Appl. No.: 10/485,255

(22) PCT Filed: Aug. 8, 2002

(86) PCT No.: PCT/JP02/08126

§ 371 (c)(1),
(2), (4) Date: Feb. 6, 2004

(87) PCT Pub. No.: WO03/015894

PCT Pub. Date: Feb. 27, 2003

(65) Prior Publication Data

US 2004/0194624 A1    Oct. 7, 2004

(30) Foreign Application Priority Data

Aug. 9, 2001    (JP) .............................. 2001-242351

(51) Int. Cl.
*B01D 39/14* (2006.01)

(52) U.S. Cl. ..................... 55/522; 55/526; 55/527; 55/528; 428/290; 428/288; 428/921; 428/181; 428/220; 428/280; 428/34.2; 442/103; 442/358; 442/402

(58) Field of Classification Search ................ 55/522, 55/526, 527, 528; 428/181, 220, 280, 172, 428/34.2, 290, 288, 921; 442/103, 402, 358; 438/34.2

See application file for complete search history.

(56) References Cited

U.S. PATENT DOCUMENTS

| 4,405,341 A | * | 9/1983 | Jaschek et al. | ............... | 51/298 |
| 4,536,439 A | * | 8/1985 | Forsten | .................. | 442/334 |
| 4,859,713 A | * | 8/1989 | Blount | .................. | 521/106 |
| 4,874,658 A | * | 10/1989 | Sasaki et al. | .............. | 428/220 |
| 4,917,714 A | * | 4/1990 | Kinsley, Jr. | ................. | 55/524 |

(Continued)

FOREIGN PATENT DOCUMENTS

EP        0094165 A2    11/1983

(Continued)

*Primary Examiner*—Minh-Chau T. Pham
(74) *Attorney, Agent, or Firm*—Armstrong, Kratz, Quintos, Hanson & Brooks, LLP

(57) ABSTRACT

To provide a heat resistant filter of which the reduction of tensile strength and folding endurance is small even when used as a filter material for a filter used at high temperatures, failure of the filter material is difficult even when used at high temperatures, and which is capable of achieving a long life. The heat resistant filter contains: a heat resistant organic fiber base material, and a resin composition which contains an alkaline substance and which adheres to the heat resistant organic fiber base material.

18 Claims, 1 Drawing Sheet

U.S. PATENT DOCUMENTS

| | | | | |
|---|---|---|---|---|
| 4,961,974 A | * | 10/1990 | Jones | 428/34.2 |
| 5,145,913 A | * | 9/1992 | Gerber | 525/506 |
| 5,175,339 A | * | 12/1992 | Babayan et al. | 560/52 |
| 5,182,346 A | * | 1/1993 | Gerber | 525/503 |
| 5,308,692 A | * | 5/1994 | Kennedy et al. | 442/327 |
| 5,350,620 A | * | 9/1994 | Sundet et al. | 428/172 |
| 5,389,716 A | * | 2/1995 | Graves | 524/510 |
| 5,393,601 A | * | 2/1995 | Heinrich et al. | 442/411 |
| 5,397,632 A | * | 3/1995 | Murphy et al. | 442/358 |
| 5,429,864 A | * | 7/1995 | Samuels | 442/36 |
| 5,480,706 A | * | 1/1996 | Li et al. | 428/113 |
| 5,484,653 A | * | 1/1996 | Kennedy et al. | 442/415 |
| 6,103,643 A | * | 8/2000 | Forsten | 442/103 |
| 6,752,847 B2 | * | 6/2004 | Smithies | 55/521 |
| 2003/0088800 A1 | * | 5/2003 | Kimura et al. | 524/115 |
| 2003/0110745 A1 | * | 6/2003 | Smithies | 55/524 |
| 2005/0003199 A1 | * | 1/2005 | Takaya et al. | 428/413 |
| 2005/0256234 A1 | * | 11/2005 | Kurumatani et al. | 524/115 |

FOREIGN PATENT DOCUMENTS

| | | |
|---|---|---|
| EP | 1096057 A1 | 5/2001 |
| JP | 58-207918 | 12/1983 |
| JP | 11-158776 | 6/1999 |
| JP | 2001-192953 | 7/2001 |

* cited by examiner

HEAT-RESISTANT FILTER

TECHNICAL FIELD

The present invention relates to a heat resistant filter combining excellent heat resistance, hydrolytic resistance, and acid resistance. The heat resistant filter of the present invention is ideally used, for example, in a filter material for filters in order to collect dust such as high temperature dust exhausted from a coal boiler, garbage incinerator, metal blast furnace, diesel automobile, and the like.

BACKGROUND ART

Conventionally, as is widely known, bag filters have been used as filters for collecting dust exhausted from garbage incinerators, coal boilers, metal blast furnaces, and the like. The filter material of a bag filter requires heat resistance since the exhaust gas temperature is at a high temperature of 140° C. to 250° C., and also requires acid resistance and resistance to hydrolysis since acidic gases, such as $SO_x$ and $NO_x$, and moisture are contained in the exhaust gas. Therefore, various types of heat resistant fibers such as polyphenylenesulfide (referred to as "PPS" below) fiber, meta-aramid fiber, polyimide fiber, fluorofiber, glass fiber, or the like have been used as the filter material, and non-woven fabrics, in particular, have been used.

Furthermore, in recent years, there has been a desire to filter as much exhaust gas as possible at a high collection efficiency, i.e., within a limited space, within this temperature range, and it is necessary to establish a large filtering surface area within a narrow space. Therefore, as described in the publication of Japanese Unexamined Patent Application, First Publication No. Hei 11-158776, a filter has been developed in which a synthetic resin is impregnated in a PPS non-woven fabric and a pleating process is carried out on the filter material. Furthermore, as the resin for impregnation, the publication of Japanese Unexamined Patent Application, First Publication No. 2001-192953, for example, discloses that if a melamine resin or phenol-formaldehyde resin is used as the resin for impregnation forming, then the heat resistance is very good, softening is difficult even at high temperatures, and the pleat shape retentivity at high temperatures during impregnation of the base material is good.

However, in the fiber base material in which a phenolic resin having a pH of 4 to 8 is impregnated into a non-woven fiber comprising the PPS fiber proposed in the publication of Japanese Unexamined Patent Application, First Publication No. 2001-192953 described above, when used for a long period of time at high temperatures, there were problems such as an abnormal degradation of strength, a large decrease in the tensile strength and folding endurance, and failure of the filter material during use over a long period of time. As an explanation for the cause of the above-mentioned degradation of strength, it is presumed that the degradation of strength occurred as a result of the multiplied breakdown effect due to the breakdown of the phenol resin resulting from an acidic gas such as $SO_x$ or $NO_x$ contained in the exhaust gas, or the further breakdown of the PPS fiber by oxidation degradation, the generation of oxides such as $SO_2$, the breakdown of the phenol resin by these oxides, and further, the breakdown of the PPS fibers by the breakdown product of the phenol resin. Furthermore, even in the case of a meta-aramid fiber, para-aramid fiber, or polyimide fiber, in addition to the above-mentioned exhaust gas, oxides such as $NO_x$ are produced by oxidation degradation and hydrolysis, and these oxides are presumed to promote breakdown of the phenol resin. Furthermore, when a fluorofiber is used as well, although there is no generation of acidic gas such as $SO_x$ and $NO_x$ derived from the fiber, it is not possible to avoid the promotion of the breakdown of the phenol resin fiber due to acidic gas such as $SO_x$ and $NO_x$ in the exhaust gas.

DISCLOSURE OF INVENTION

The object of the present invention is to eliminate the deficiencies of the prior art, and to provide a heat resistant filter of which the reduction of the tensile strength and folding endurance is small even when used as a filter material for filters used at high temperatures, failure of the filter material is difficult when used at high temperatures, and which is capable of achieving a long life.

As a result of diligent investigation into solving the above-mentioned problems, the present inventors discovered that it is effective to add an alkaline resin as a binder to a heat resistant fiber base material in order to solve these problems.

In other words, the present invention provides a heat resistant filter comprising: a heat resistant organic fiber base material, and a resin composition which contains an alkaline substance and which adheres to said heat resistant organic fiber base material.

BEST MODE FOR CARRYING OUT THE INVENTION

Figure 1:
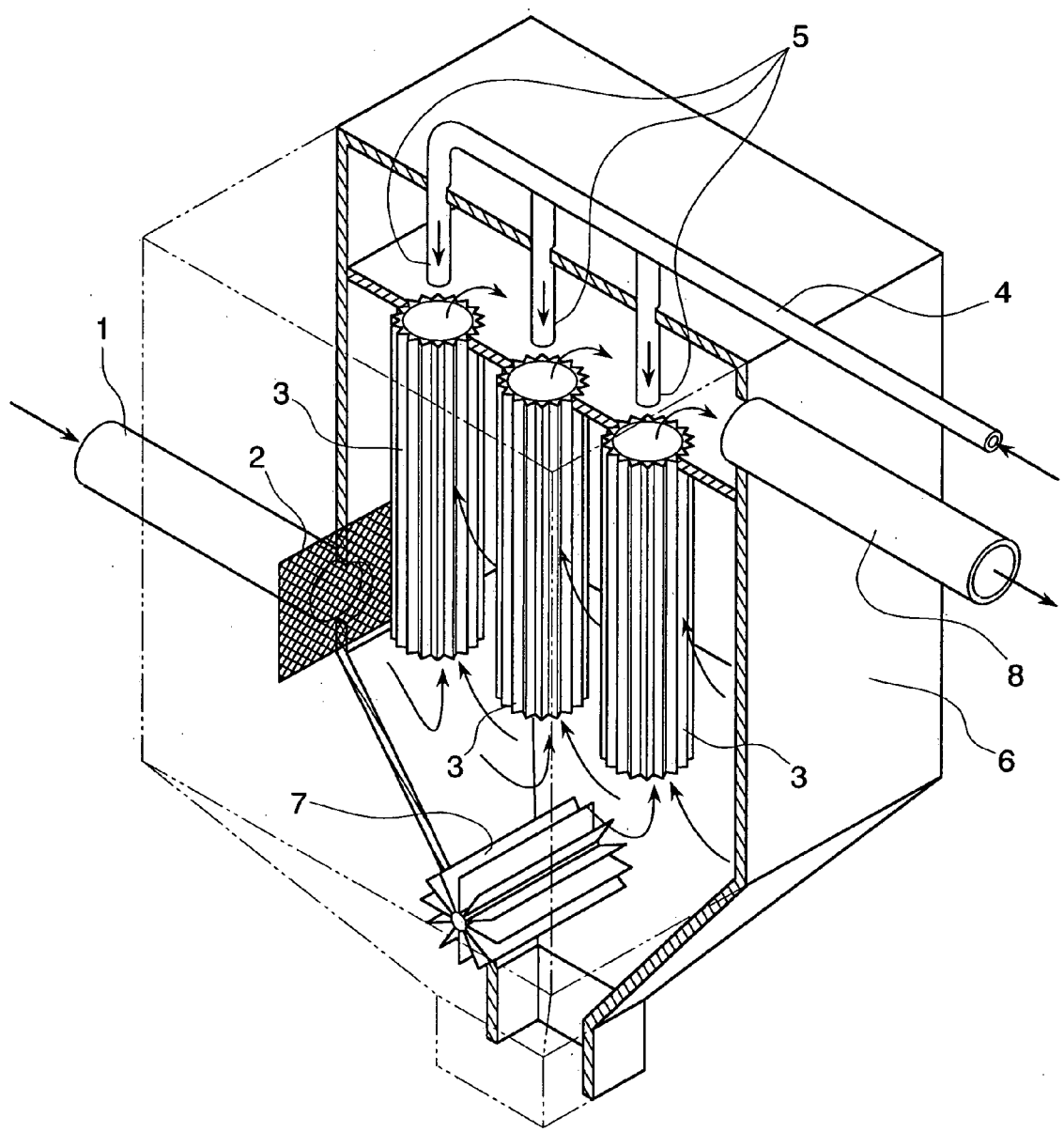
FIG. 1 is a schematic drawing of an example in which the heat resistant filter of the present invention is used as a pleated filter for a dust collector provided at the rear of an incinerator.

The heat resistant organic fiber constituting the heat resistant organic fiber base material used in the present invention preferably contains at least one selected from the group consisting of a PPS fiber, para-aramid fiber, meta-aramid fiber, polyamidoimide fiber, polyimide fiber, and fluorofiber. Moreover, it may also contain an inorganic heat resistant fiber such as a glass fiber or carbon fiber.

The above-mentioned PPS fiber is made from a polymer containing phenylenesulfide structural units in which 90% or more of the structural units are constituted by —($C_6H_4$—S)—.

Furthermore, the para-aramid fiber and meta-aramid fiber are synthetic polymers comprising an aromatic group linked via an amide bond, and each amide group may be bonded at a meta position or a para position. Commercially available products, such as KEVLAR (product name) manufactured by Du Pont-Toray Co., Ltd., can be given as examples of the above-mentioned para-aramid fiber. Moreover, commercially available products, such as NOMEX manufactured by DuPont, can be given as examples of the above-mentioned meta-aramid fiber. Furthermore, KERMEL (manufactured by Rhone-Poulenc) can be given as an example of the polyamidoimide fiber. Additionally, P-84 (manufactured by Lenzing) can be given as an example of the polyimide fiber.

Moreover, a fiber comprising a polymer constituted by a monomer in which 90% or more of the repeated structural units contain fluorine atoms in the main chain or side chain can be given as an example of the above-mentioned fluorofiber. As examples of these polymers, tetrafluoroethylene-hexafluoropropylene copolymer (FEP), tetrafluoroethyleneperfluoroalkoxy vinyl ether copolymer (PFA), ethylene-tetrafluoroethylene copolymer (ETFE), polytetrafluoroethylene (PTFE), and the like can be given. Among these, polytetrafluoroethylene (PTFE) is preferred due to its heat resistance and chemical resistance.

Among these heat resistant organic fibers, a PPS fiber which is superior in heat resistance, hydrolytic resistance, and acid resistance, and which is relatively low cost is preferred.

Furthermore, when a PPS fiber is used as the heat resistant organic fiber and when used as a pleated filter, for cases of unsatisfactory conditions which result in heat deformation such as softening of the filter material when used at a high temperature of 170° C. or more, deformation of the pleated shape, and sudden increase in pressure drop during filtering of exhaust gas, it is more preferable to combine fibers that have high heat resistance with which deformation is difficult even at high temperatures, such as para-aramid fiber and glass fiber.

When using the above-mentioned PPS fiber with the above-mentioned fiber having high heat resistance, it is preferable that the mixing ratio of the PPS fiber to the fiber having high heat resistance be in a proportion such that the PPS fiber has a content ratio of 50 weight percent or more in order to maintain the acid resistance, resistance to hydrolysis, and the like. Moreover, it is preferable that the PPS fiber be contained in a ratio of 70 weight percent or more. If the mixing ratio of the PPS fiber is 50 weight percent or more of the fiber base material, then even if used as a filter in an environment containing acidic gas at a high temperature and high moisture content, the fiber base material will not degrade and there will be no decrease in the tensile strength and folding endurance of the filter, and even if used for a long period of time, the danger of failure of the filter is low.

The technique for combining these various heat resistant organic fibers is not particularly limited, and a widely-known carding method, air-laid method, paper-making method, and the like can be used.

The technique for obtaining the heat resistant organic fiber base material used in the heat resistant filter of the present invention can be a widely-known method such as a weaving, knitting, or making non-weaving method. However, when used as a filter, a making non-weaving method is preferred because dust collection is efficient, and there is little increase in pressure drop due to clogging even if used over a long period of time.

Furthermore, as the resin composition containing an alkaline substance used in the present invention, various resin compositions containing an alkaline substance can be given as examples, such as an alkaline phenol resin composition, a polyamidoimide resin composition containing an alkaline substance, a polyimide resin composition containing an alkaline substance, and an aramid resin composition containing an alkaline substance.

Moreover, the alkaline substance is not particularly limited as long as it is possible to trap acidic gas such as $SO_x$ and $NO_x$ under conditions in which the heat resistant filter of the present invention is used. Alkaline metal hydroxides, alkaline earth metal hydroxides, alkaline metal oxides, alkaline earth metal oxides, and amines can be given as examples. Among these, alkaline metal hydroxides or alkaline earth metal hydroxides are preferred. Additionally, sodium hydroxide, potassium hydroxide, and barium hydroxide are particularly preferred.

A resol phenol resin obtained by reacting a phenol and an aldehyde in the presence of an alkaline reaction catalyst or a novolac phenol resin obtained by reacting a phenol with an aldehyde in the presence of an acid catalyst or a metallic salt catalyst can be given as examples of the phenol resin included in the alkaline phenol resin composition described above.

For the case of a resol phenol resin composition, during the resin forming reaction, the alkaline phenol resin composition described above can be made alkaline by adding the alkaline substance described above as a catalyst and causing a reaction. Alternatively, it can be made alkaline by combining an alkaline substance with the resol phenol resin for which the reaction has been completed. In addition, for the case of a novolac phenol resin composition, a novolac phenol resin and hexamethylenetetramine can be dissolved in an aqueous solution of the alkaline substance. Alternatively, for the case of a resol phenol resin as well which has been reacted under low alkaline conditions, the above-mentioned alkaline substance can be added afterwards. The amount of alkaline substance contained is preferably 0.1 mol or more with respect to 1 mol of a phenolic hydroxyl group in the resin from the standpoint of having a remarkable heat degradation suppressing effect. From the standpoint of being able to have more of the resin portion adhere to the filter, it is preferable to use 1.0 mol or less of the alkaline substance with respect to 1 mol of the phenolic hydroxyl group in the resin.

The phenol resin used in the alkaline phenol resin composition described above can be obtained by reacting a phenol with an aldehyde, for example. The above-mentioned phenol is not particularly limited, and a phenol, an alkyl phenol such as cresol, an aromatic diol such as resorcinol and catechol, and a bisphenol such as bisphenol A can be given as examples. Furthermore, formaldehyde, paraformaldehyde, acetoaldehyde, and the like can be given as examples of the aldehyde.

Moreover, sodium hydroxide, potassium hydroxide, calcium hydroxide, barium hydroxide, sodium carbonate, ammonia, hexamethylenetetramine, and the like can be given as examples of the alkaline catalyst used in the resol forming reaction for obtaining the resol phenol resin composition used in the alkaline phenol resin composition described above. An acid such as sulfuric acid, oxalic acid, and paratoluenesulfonic acid, and a polyvalent metallic salt such as calcium oxide, magnesium oxide, and zinc acetate can be given as examples of the catalyst for the case of a novolac reaction.

The ratio of aldehyde/phenol for producing the phenol resin is preferably 1.0 to 3.5 with respect to a molar ratio of [(aldehyde)/(phenol)] for the case of a resol phenol resin. From the standpoint of good storage stability and a small release amount of formaldehyde, [(aldehyde)/(phenol)] (molar ratio)=1.5 to 2.5 is particularly preferred.

Furthermore, for the case of a novolac phenol resin, a molar ratio of [(aldehyde)/(phenol)] of 0.3 to 1.0 is preferred.

Moreover, in order to improve the fast hardenability of the phenol resin itself, a resin in which a denaturant such as resorcinol or aminophenol has undergone partial co-condensation can be combined with the phenol resin. It is preferable if the denaturant undergoes co-condensation at 0.1 to 20 weight percent with respect to the total weight of the resin solid content. If the above-mentioned denaturant is used, from the standpoint of exhibiting a remarkably improved fast hardening effect due to co-condensation, 0.1 weight percent or more is preferred, and from the standpoint of not increasing the cost of the resin, 20 weight percent or less is preferred.

As the polyamidoimide resin composition containing an alkaline substance used in the present invention, an example can be given in which the above-mentioned alkaline substance is mixed into a polyamidoimide resin solution of a aprotic polar solvent such as dimethylacetoamide in solid form or in the form of an aqueous solution. Furthermore, as the polyimide resin solution containing an alkaline substance or the aramid resin composition containing an alkaline substance, an alkaline substance can be added after dissolving the polyimide resin or the aramid resin using a solvent such as described above. Moreover, if these resins do not dissolve in the solvent, after suspending the resin in water or the like, the alkaline substance can be mixed in either solid form or liquid form. In this case, from the standpoint of achieving a remarkable heat degradation suppressing effect, two parts by weight or more of the added alkaline substance converted to solid sodium hydroxide per 100 parts by weight of the solid portion of the resin containing an alkaline substance is preferable. Furthermore, from the standpoint of being able to have more of the resin portion adhere to the filter, 20 parts by weight or less converted to solid sodium hydroxide per 100 parts by weight of the solid content of the resin containing an alkaline substance is preferable.

In particular, when used as a pleated filter, from the standpoint of obtaining superior pleated shape retaining characteristics at high temperatures during use as a filter, an alkaline phenol resin composition is preferred. Moreover, these resin compositions for adhering which contain an alkaline substance can be used either alone or a combination of multiple types can be used.

The heat resistant filter of the present invention assumes the basic constitution of a heat resistant organic fiber base material and a resin composition containing an alkaline substance, wherein the resin composition containing an alkaline substance is impregnated into or applied to the heat resistant organic fiber base material. By applying the resin composition containing an alkaline substance to the heat resistant organic fiber base material, there is little reduction in the tensile strength and folding endurance of the filter when used at high temperatures, and it is possible to achieve a long life when used as a filter at high temperatures.

Furthermore, in addition to the resin composition containing an alkaline substance, a sodium silicate, which is an alkaline inorganic binder, or the like can also be used. When using such a combination, sodium silicate can be used by mixing with an alkaline resin composition, e.g., an alkaline phenol resin composition, and after impregnating the alkaline phenol resin composition and drying, the sodium silicate can be impregnated. Conversely, after impregnating the sodium silicate and drying, the alkaline phenol resin composition can be impregnated.

The resin composition containing an alkaline substance for restricting the heat resistant fiber describe above surrounds at least the point of intersection of the fibers constituting the fiber base material and adheres to the fibers, and relative movement between one fiber and another is suppressed. Therefore, it is possible to provide rigidity to the fiber base material. Even if the state of the adhesion is like webbed toes at the point of intersection of one fiber with another (i.e., in the vicinity of the point of intersection of the fibers, the resin composition containing an alkaline substance adheres to each fiber which forms the point of intersection of the fibers, and a portion of the resin composition containing an alkaline substance is spread as a membrane), adhering in spots may be carried out, but adhering like webbed toes is preferred since the resistive force against physical deformation is high.

Here, it is preferable that the solid content impregnation amount with respect to the heat resistant organic fiber base material of the resin composition containing an alkaline substance be 5 to 80 parts by weight with respect to 100 parts by weight of the heat resistant organic fiber base material. Since the restrictive force for restricting the fibers or the filter rigidity during use as a pleated filter is high, a solid content impregnation amount of 5 parts by weight or more is preferable. Moreover, it is possible to sufficiently ensure a space which allows exhaust gas and the like to pass, and by this means, since it is possible to suppress the pressure drop during filtering of exhaust gas without decreasing the amount passing through the filter, the solid content impregnation amount is preferably 80 parts by weight or less.

In the heat resistant filter of the present invention, a retention ratio of the tensile strength at break of 50% or more measured based on JIS L 1096 after processing for 10 days in air at 250° C. is preferable since it is difficult for the filter to be degraded and for failure to occur.

Furthermore, in the heat resistant filter of the present invention, a retaining ratio of the folding endurance of 3% or more measured based on JIS P-8115 after processing for 10 days in air at 250° C. is preferable since it is difficult for the filter to be degraded when used at high temperatures and since it is difficult for failure of the filter to occur even if physical folding fatigue is applied when removing dust at high temperatures.

The present inventors discovered that the rigidity of the heat resistant filter at the standard conditions (temperature: 20° C., pressure: atmospheric) required in order to achieve high rigidity at high temperatures can be evaluated by the stiffness based on the Gurley method specified in JIS-L1096. The stiffness of the heat resistant fiber base material is preferably 40 mN or more in view of superior pleated shape retentivity at high temperatures, and 150 mN or less is preferable in view of having a simple pleating process. After impregnating or applying the resin solution to the fiber base material, the moisture of the resin mixture solution is removed, and after curing the resin at a high temperature of about 200° C., the stiffness to be measured in the present invention is measured. By impregnating or applying the resin to the fiber base material in this way, the point of intersection of the fibers with one another can be restricted, and the stiffness of the fiber base material can be greatly improved.

The above performances of the retaining ratio of the tensile strength at break, the retaining ratio of the folding endurance, and the stiffness based on the Gurley method after processing for 10 days in air at 250° C. can be achieved by adjusting the impregnation or application amount of the resin composition containing an alkaline substance, the kind of resin composition containing an alkaline substance, and the degree of alkalinity (such as the amount of alkaline catalyst used during resin polymerization or the amount of alkali added to the resin). Thereby, the heat resistance during use over a long period of time is greatly improved.

Since it is difficult to cause the fibers to break during carding or needle punching of the fibers, and since the strength of the heat resistant filter decreases, it is preferable that the fineness of a single fiber of the heat resistant fibers constituting the heat resistant fiber base material used in the present invention be 0.11 decitex or more, and 22 decitex or less is preferable in view of having good dust collecting ability without decreasing the surface area of the fiber.

A heat resistant filter obtained in this way can be advantageously used as an air filter by carrying out a bending process into a pleated shape. Particularly, it is more preferably used in view of high rigidity at high temperatures when collecting high temperature exhaust gas and the like.

FIG. 1 is a schematic diagram of an example in which the heat resistant filter of the present invention is used as a pleated filter for a dust collector provided at the rear of an incinerator. If the heat resistant filter of the present invention exploits the technical features of the present invention, then it is of course possible to use it in uses other than for dust collectors, and it is not particularly limited.

Reference symbol 1 in FIG. 1 is an inlet for high temperature dirty gas exhausted from an incinerator in a previous step, which is not shown in the figure. Reference symbol 2 is a porous plate for removing large size dust beforehand. Reference symbol 3 is a filter material in which the heat resistant filter of the present invention is formed in a pleated shape (referred to below as "pleated filter material"). Reference symbol 4 is a high pressure air pipe which feeds high pressure gas from the outside. Reference symbol 5 is a blow pipe for spraying the high pressure gas into the vicinity of the inlet of each pleated filter material. Reference symbol 6 is a hopper. Reference symbol 7 is a screw conveyor for periodically exhausting dust accumulated at the bottom portion. Reference symbol 8 is a gas outlet which has been cleaned.

In the dust collector constituted as such, dirty gas enters from the gas inlet 1 and proceeds into the hopper 6 through the porous plate 2. The dirty gas inside the hopper travels through the pleated filter material 3, thereby becomes cleaned gas, and is exhausted from the gas outlet 8. Moreover, dust which becomes attached to the surface of the pleated filter material 3 by the filtering of the dirty gas is intermittently removed by high pressure air blown from the blow pipe 5 through the high pressure air pipe 4.

As a primary example of a use other than that described above, it is possible to use the filter as a filter which is sewn into a common tube shape without carrying out a pleating process and which filters exhaust gas and the like. Moreover, it can also be used as liquid filter for filtering a liquid, or as a filter for filtering exhaust gas of a diesel automobile.

Furthermore, by attaching a microporous membrane to the surface of the heat resistant filter, it is possible to use it as a heat resistant filter having an even higher dust collecting capability when used as a filter, and it is possible to use it as a heat resistant filter having a superior dust removing ability when removing dust by means of a pulse jet. The microporous membrane to be used is not particularly limited, and it is possible to use a publicly-known microporous fluorocarbon membrane or the like. The above-mentioned surface of the heat resistant filter is a surface on which dust accumulates during use as a filter.

Next, a preferred production method for obtaining the heat resistant filter of the present invention will be described. The heat resistant fiber base material which constitutes the heat resistant filter of the present invention can be any fiber base material such as a woven fabric, non-woven fabric, or knitted fabric, but preferably it is a non-woven fabric from the standpoint of dust collecting capability. Furthermore, as the non-woven fabric, it is possible to use a publicly-known non-woven fabric, for example, as a short fiber non-woven fabric, a needle-punched non-woven fabric, a wet non-woven fabric, a spun lace non-woven fabric, an airlaid non-woven fabric, or the like can be used. In addition, as a long fiber non-woven fabric, it is possible to use a spun-bonded non-woven fabric, a melt-blow non-woven fabric, a tow opening type non-woven fabric, or the like. Moreover, in the method for restricting the fibers, a resin bonded non-woven fabric is preferably used in the present invention, but it is also possible to use other chemical bonded non-woven fabrics, thermal bonded non-woven fabrics, and the like, in accordance with need. Among these production methods, from the standpoint of rigidity and tensile strength of the filter material when used as a filter material for a pleated filter, a production method for a needle punched non-woven fabric which allows entangling of fibers by means of needles, or a spun lace non-woven fabric which allows intertwining of the fibers due to a stream of water, or a production method of a thermal adhesive type spun-bonded non-woven fabric is preferred.

Furthermore, as the production method of the heat resistant filter of the present invention, if a non-woven fabric is taken as an example of the heat-resistant fiber base material, after opening the fiber using a common carding machine, the obtained fleece is layered, and entangling of the fibers is achieved by a needle punch. By means of this entangling, the non-woven fabric can be obtained.

The obtained non-woven fabric undergoes thermal press processing using a thermal press, heat roll calender, or the like, at a temperature of 100° C. to 280° C., and a line pressure of 98 to 6860 N/cm with a clearance of 0 to 1 mm. By means of this thermal press process, the thickness of the non-woven fabric is adjusted. By means of this thermal press process, the fibers positioned on the surface layer of the non-woven fabric are made dense. Regarding the density distribution in the thickness direction of the non-woven fabric, it is preferable if there is density variation in the thickness direction on a surface parallel to the surface of the non-woven fabric such that the ratio A/B of the density A of the two surface layers obtained during slicing of the non-woven fabric into 3 equal parts in the thickness direction to the density B of the single intermediate layer is within the range of 1.1 to 2.5.

By making the surface layer dense in this way, it is possible to obtain a heat resistant fiber base material having a constitution in which the rigidity is like that of cardboard, for example, and it is possible to obtain a heat resistant fiber base material which is superior in capability of removing dust. The means for this thermal press process is not particularly limited, and it is possible to use any means as long as the surface of the non-woven fabric can be subjected to the thermal press process. The surface of the roll which is in contact with the non-woven fabric can be flat or one which has roughness.

Next, a solution which contains a resin composition containing an alkaline substance preferably having a viscosity of 50 to 700 mPa·s is impregnated in the obtained non-woven fabric using a dip mangle. The non-woven fabric impregnated with the alkaline resin composition is processed by a tenter at 120° C. to 300° C., and the impregnated alkaline resin is dried and cured. The target heat resistant filter is then produced.

The heat resistant filter of the present invention can be advantageously used as an exhaust gas collecting filter for a coal boiler, an exhaust gas collecting filter for a metal blast furnace, an exhaust gas collecting filter for a garbage incinerator, or an exhaust gas collecting filter for a diesel automobile.

EXAMPLES

Below, examples and comparative examples relating to the present invention will be explained. The parts and percentages used below are, without particular exception, on a weight basis.

Production Example 1

A flask equipped with a reflux device was charged with 1000 grams of phenol, 1596 grams of a 40% formaldehyde aqueous solution, and 900 grams of deionized water. While stirring, 400 grams of a 50% aqueous solution of sodium hydroxide were gradually added, the temperature was increased to 80° C., a reaction was carried out at 80° C. for 5 hours, and an alkaline resol phenol resin aqueous solution was obtained. The solid content concentration of the obtained alkaline resol phenol resin aqueous solution was 40%, the viscosity was 120 mPa·s, and the pH was 11.0.

Production Example 2

A flask equipped with a reflux device was charged with 1000 grams of phenol, 1596 grams of a 40% formaldehyde aqueous solution, and 900 grams of ion exchanged water. While stirring, 40 grams of a 50% aqueous solution of sodium hydroxide were gradually added, the temperature was increased to 80° C., a reaction was carried out at 80° C. for 3 hours, and an alkaline resol phenol resin aqueous solution was obtained. The solid content concentration of the obtained alkaline resol phenol resin aqueous solution was 38.9%, and the pH was 8.9.

Production Example 3

A flask equipped with a reflux device was charged with 1000 grams of phenol, the temperature was increased to 75° C., and 10 grams of 98% sulfuric acid were added while stirring. Next, while holding the temperature at 85° C., 518 grams of a 40% formaldehyde aqueous solution were added by dripping. After reacting at 85° C. for 5 hours, 300 grams of water were removed by distillation under reduced pressure. While further increasing the temperature to 170° C., water was removed by distillation at normal pressure, and a novolac phenol resin was obtained. The softening point of the obtained novolac phenol resin was 80° C.

Example 1

A web was formed by a carrying out a carding process on a PPS short fiber (TORCON manufactured by Toray Industries, Inc.) having a single fiber fineness of 2.2 decitex and a fiber length of 51 mm. Next, after layering, a needle punch process was carried out and a non-woven fabric was obtained. The obtained non-woven fabric was subjected to a thermal process in a calender roll at a temperature of 190° C., a line pressure of 2,940 N (300 kgf/cm), and a clearance of 0 mm. A PPS non-woven fabric was produced having an weight of 200 g/m$^2$, and a thickness of 1.1 mm. The alkaline resol phenol resin aqueous solution obtained in Production Example 1 was impregnated into the obtained PPS non-woven fabric as the alkaline phenol resin composition using a dip mangle. Next, the moisture content of the resin mixture liquid was removed using a drier at 200° C. for 5 minutes, and this was taken to be stage B. Next, a thermal process was carried out at 200° C. for 3 minutes, and this was taken to be stage C. The obtained compound C had a thickness of 1.2 mm, a density of 0.24 g/cm$^3$, and a deposited amount of the alkaline phenol resin onto the fiber base material of 100 g/m$^2$. In order to evaluate this article as a filter in terms of heat resistance capability, a thermal process was carried out in an air atmosphere at 200° C. for 30, 60, and 90 days. The tensile strength and folding endurance were measured under conditions of a specimen width of 5 cm, grip spacing of 10 cm, and pulling speed of 10 cm/mm, based on JIS L 1096. Furthermore, regarding the folding endurance, the folding endurance was measured based on a folding endurance test method by an MIT tester for paper and cardboard disclosed in JIS P-8115, and the flexibility of the sheet was observed.

For comparison, a specimen which did not undergo thermal processing was also measured.

The above-mentioned stage B and stage C are terms expressing the cross-linking stages of a resin. Stage B shows the stage in which the moisture content of the resin mixture liquid is removed. Moreover, stage C shows the stage in which the cross-linking reaction of a resin has progressed due to the addition of heat to the resin obtained after removing the moisture content and drying.

Example 2

10 parts of a 50% sodium hydroxide aqueous solution were added to 100 parts of the alkaline resol phenol resin aqueous solution obtained in Production Example 2 to form a mixture liquid for impregnation. The concentration of this mixture liquid was 39.1%, the viscosity was 130 mPa·s, and the pH was 11.2. This mixture liquid was impregnated into the PPS non-woven fabric used in Example 1 using the same method as that of Example 1, and formed. The thickness of the formed article thus obtained was 1.3 mm, and the density was 0.22 g/cm$^3$. The heat resistance capability of this impregnated non-woven fabric as a filter was investigated using the same method as that of Example 1.

Example 3

90 parts of the novolac phenol resin obtained in Production Example 3 were pulverized and made into block form, 10 parts of hexamethylenetetramine were added and mixed therein, and further pulverizing was carried out so as to achieve an average particle size of 30 μm. This was added to 200 parts of a 10% sodium hydroxide aqueous solution and dissolved, and a mixture liquid for impregnation comprising an alkaline phenol resin was obtained. Using this mixture liquid, the mixture liquid was impregnated into the same PPS non-woven fabric as that used in Example 1 using the same method as that of Example 1, and formed. The thickness of the formed article thus obtained was 1.4 mm, and the density was 0.21 g/cm$^3$. The heat resistance capability of this impregnated non-woven fabric as a filter was investigated using the same method as that of Example 1.

Comparative Example 1

A resin for impregnation, in which Phenolite TD-4304 (manufactured by Dainippon Ink and Chemicals, Inc., viscosity: 870 mPa·s, pH: 5.5) as the resol phenol resin composition and water were mixed in a weight ratio of 50/50, was impregnated into the same PPS non-woven fabric as that used in Example 1 using the same method as that of Example 1, and formed. The thickness of the formed article thus obtained was 1.2 mm, and the density was 0.24 g/cm$^3$. The heat resistance capability of this impregnated non-woven fabric as a filter was investigated using the same method as that of Example 1.

Comparative Example 2

90 parts of the novolac phenol resin obtained in Production Example 3 were pulverized and made into block form, 10 parts of hexamethylenetetramine were added and mixed therein, and further pulverizing was carried out so as to achieve an average particle size of 30 μm. This was added to 150 parts of methanol, dissolved, and a mixture liquid for impregnation was obtained. Using this mixture liquid and using the PPS non-woven fabric of Example 1, impregnation was carried out using the same method as that of Example 1, and formed. The thickness of the formed article thus obtained was 1.4 mm, and the density was 0.21 g/cm$^3$. The heat resistance capability of this impregnated non-woven fabric as a filter was investigated using the same method as that of Example 1.

The evaluation results of the formed articles obtained in Examples 1–3 and Comparative Examples 1 and 2 described above are shown in Table 1.

TABLE 1

|  | Example 1 | Example 2 | Example 3 | Comparative Example 1 | Comparative Example 2 |
| --- | --- | --- | --- | --- | --- |
| Thickness of formed article (mm) | 1.2 | 1.3 | 1.4 | 1.2 | 1.4 |
| Density of formed article (g/cm$^3$) | 0.24 | 0.22 | 0.21 | 0.24 | 0.21 |
| Tensile strength (N/5 cm) | | | | | |
| Initial | 690 | 670 | 700 | 730 | 660 |
| 200° C., after 5 days | 630 | 620 | 640 | 310 | 290 |
| 200° C. after 30 days | 420 | 400 | 430 | 0 | 0 |
| 200° C., after 60 days | 380 | 390 | 360 | 0 | 0 |
| Elongation at break (%) | | | | | |
| Initial | 18 | 20 | 19 | 21 | 23 |
| 200° C., after 5 days | 16 | 18 | 15 | 10 | 12 |
| 200° C., after 30 days | 15 | 15 | 14 | 0 | 0 |
| 200° C., after 60 days | 12 | 13 | 13 | 0 | 0 |
| Folding endurance (cycle) | | | | | |
| Initial | 8,600 | 9,120 | 8,760 | 8,960 | 8,750 |
| 200° C., after 5 days | 8,720 | 8,890 | 7,980 | 4,200 | 3,570 |
| 200° C., after 30 days | 8,390 | 7,680 | 7,700 | 0 | 0 |
| 200° C., after 60 days | 8,200 | 7,510 | 7,560 | 0 | 0 |

As is clear from Table 1, the formed articles of Examples 1–3 have a smaller reduction in the tensile strength and folding endurance when processed at 200° C. and the heat resistance was good, in comparison with the formed articles of the comparative examples. When the formed articles of Examples 1–3 and the formed articles of Comparative Examples 1 and 2 were used as a pleated filter for collecting exhaust gas from a coal boiler, cracks and failure appeared in the crest portions of the pleats in the filters constituted by the formed articles of Comparative Examples 1 and 2 for 120 days of use. However, no cracks or failure appeared in the heat resistant filters constituted by the formed articles of Examples 1–3 even after 700 days of use.

INDUSTRIAL APPLICABILITY

The heat resistant filter according to the present invention has little reduction in the tensile strength and folding endurance when used at high temperatures due to the impregnation or application of an alkaline binder to a heat resistant organic fiber, and is further capable of achieving a long life when used as a filter at high temperatures.

The heat resistant filter according to the present invention can particularly be used as a pleated filter, in view of its superiority in shape retaining capability at high temperatures.

The invention claimed is:

1. A heat resistant filter comprising: a heat resistant organic fiber base material with the organic fiber content being more than 50 percent; and a resin composition which contains an alkaline substance and which adheres to said heat resistant organic fiber base material;

wherein said resin composition containing an alkaline substance contains at least one resin composition selected from the group consisting of: an alkaline phenol resin composition; a polyamidoimide resin composition containing an alkaline substance; a polyimide resin composition containing an alkaline substance; and an aramid resin composition containing an alkaline substance.

2. A heat resistant filter according to claim 1, wherein said heat resistant organic fiber base material contains at least one heat resistant organic fiber selected from the group consisting of: a polyphenylenesulfide fiber; a para-aramid fiber; a meta-aramid fiber; a polyamidoimide fiber; a polyimide fiber; and a fluorofiber.

3. A heat resistant filter according to claim 2, wherein said heat resistant organic fiber base material contains 50 parts by weight or more of a polyphenylenesulfide fiber per 100 parts by weight of said heat resistant organic fiber base material.

4. A heat resistant filter according to claim 1, wherein said heat resistant organic fiber base material is a non-woven fabric.

5. A heat resistant filter according to claim 1, wherein said organic resin composition which contains an alkaline substance is a resin composition containing an alkaline phenol resin composition.

6. A heat resistant filter according to claim 5, wherein said alkaline substance is an alkaline metal hydroxide and/or an alkaline earth metal hydroxide.

7. A heat resistant filter according to claim 6, wherein said alkaline phenol resin composition contains an alkaline metal hydroxide and/or an alkaline earth metal hydroxide in an amount of 0.1 to 1.0 mol per 1 mol of a phenolic hydroxide in a phenol resin composition.

8. A heat resistant filter according to claim 1, wherein said resin composition which contains an alkaline substance is impregnated into or applied to 100 parts by weight of said heat resistant organic fiber base material so that a solid content of said resin composition containing an alkaline substance is 5 to 80 parts by weight.

9. A heat resistant filter according to claim 1, wherein a stiffness based on a Gurley method specified in JIS L 1096 is 40 to 150 mN.

10. A heat resistant filter according to claim 1, wherein a single fiber fineness of a heat resistant fiber constituting said heat resistant organic fiber base material is 0.11 to 22.2 decitex.

11. A heat resistant filter according to claim 1 which is bent into a pleated shape.

12. A heat resistant filter according to claim 1, wherein a microporous membrane is provided on a surface.

13. A use of a heat resistant filter according to any one of claims 1 to 4 and 5 to 10, as an exhaust gas collecting filter for a coal boiler, exhaust gas collecting filter for a metal blast furnace, exhaust gas collecting filter for a garbage incinerator, or an exhaust gas collecting filter for a diesel automobile.

14. A dust collecting method comprising a step of ventilating exhaust gas of a coal boiler, metal blast furnace, garbage incinerator, or diesel automobile to a heat resistant filter according to any one of claims 1 to 4 and 5 to 12.

15. A heat resistant filter according to claim 1, wherein the solid content impregnation amount of the resin composition with respect to the heat resistant organic fiber base material is 5 to 80 parts by weight with respect to 100 parts by weight of the heat resistant organic fiber base material.

16. A dust collecting method comprising a step of: collecting dust by exhausting an exhaust gas having a temperature of 140° C. to 250° C. via the heat resistant filter according to claim 1.

17. A heat resistant filter according to claim 1, wherein said resin composition which contains an alkaline substance is the alkaline phenol resin composition; and an alkaline phenol resin therein is a resin which is obtained by adding an alkaline substance as a catalyst during a forming reaction of the resin.

18. A heat resistant filter according to claim 1, wherein said resin composition which contains an alkaline substance is impregnated into or applied to the heat resistant organic fiber base material.

* * * * *